United States Patent

[11] 3,545,404

[72] Inventor Lester R. Loftus
P.O. Box 1217, Estes Park, Colorado 80517
[21] Appl. No. 805,023
[22] Filed March 6, 1969
[45] Patented Dec. 8, 1970

[54] METHOD AND COMPOSITION FOR TREATING LIVE BAIT WORMS
5 Claims, No Drawings
[52] U.S. Cl. .................................................. 119/1; 99/3
[51] Int. Cl. ................................................. A01k 05/00;
A01k 11/00
[50] Field of Search ........................................ 119/1; 99/3

[56] References Cited
UNITED STATES PATENTS

| | | | |
|---|---|---|---|
| 2,849,981 | 9/1958 | Rose et al. ................... | 119/1 |
| 3,115,864 | 12/1963 | Wagner ...................... | 119/1 |
| 3,499,420 | 3/1970 | Atwell ........................ | 119/1 |

*Primary Examiner*—Aldrich F. Medbery
*Attorney*—Clarence A. O'Brien and Harvey B. Jacobson ABSTRACT: A method of enhancing the iridescence of live bait worms by adding to a cultivation bed for live worms containing suitable media for supporting worm life a composition comprising an aqueous slurry of comminuted paper and clam shells together with 1,2-propylene glycol, benzoic acid, methylparaben and wintergreen oil.

METHOD AND COMPOSITION FOR TREATING LIVE BAIT WORMS

The present invention relates to a novel method of enhancing the utility of live fish bait worms. More particularly, the present invention relates to a novel method and composition for increasing the iridescence of fish bait worms to enhance the ability of the so treated worms to attract fish.

It is an object of the present invention to provide a method of treating live worms, such as earthworms, whereby the worms are stimulated to secrete a substance, which when the worms are placed in water, such as during fishing, causes them to be iridescent.

In accordance with the foregoing, it is another object of the present invention to provide a composition for treating bait worms, to increase the iridescent glow thereof, which composition comprises an aqueous slurry of comminuted paper and clam shells together with 1,2-propylene glycol, benzoic acid, methylparaben and wintergreen oil, which composition is added to a cultivation bed for live worms containing suitable media for supporting worm life.

Further objects and advantages of the invention will become more readily apparent from the following detailed disclosure of the invention.

In accordance with this invention, there is provided a composition of fluid mixture with the cultivation media conventionally utilized in the culture of worms, such as earthworms, that when systemically utilized by the worms stimulates the secretion glands of the worms to produce a greater amount of, and a more iridescent secretion, than is normally produced by earthworms that are not treated in accordance with the method of the present invention.

The composition utilized in carrying forth the method of the invention is systemically utilized by the worms and while it is not desired to be limited in this respect, it is realized that the composition stimulates certain glands adjacent the outer layer or cuticle, of the worm to secrete a greater amount of iridescent secretion that passes through the pores of the cuticle and tenaciously adheres to the surface of the cuticle in fine striae covering the body of the worm. It has been found that this increase in the amount and nature of the worm secretions will cause a worm so treated to attract fish much more readily than a worm which has not been treated by the method of this invention. Furthermore, it has been found that the so produced secretion covering the body of the worm is not readily washed away by the water during utilization of the worm as fish bait whereby the worm so treated has a greatly enhanced utility by virtue of being iridescent and retaining their iridescence over a significant period of time.

More specifically, in carrying forth the novel method of the present invention, an aqueous slurry of cellulosic material such as wood pulp or comminuted paper, i.e., newspaper, comminuted to a particle size of one-quarter inch, for example, together with comminuted clam shell, particle size of approximately one thirty-second of an inch, for example, has added thereto minor proportions of 1,2-propylene glycol, benzoic acid, methylparaben and wintergreen oil. The aqueous secretion-enhancing composition is admixed with the media conventionally fed to worms and to the beds in which the worms are cultivated or shipped and wherein, for example, the composition is utilized on the basis of approximately for approximately each one hundred worms to be fed thereby or present therein.

It has been found that the object of the present invention that can be achieved by utilizing an aqueous slurry of on the basis of weight approximately one to 25 parts comminuted newspaper or wood pulp, one part comminuted clam shells, one part 1,2-propylene glycol, one-quarter to one-half part benzoic acid, one-quarter part methylparaben and one-quarter part wintergreen oil in approximately four to 50 parts water, which upon thorough mixture is ready for utilization in carrying forth the method of the present invention. It will be appreciated of course that paper or cellulosic material other than newsprint or wood pulp can be utilized and that the calcium carbonate provided by the clam shells, which are principally comprised of calcium carbonate, can be provided from other sources.

Within approximately several days to a week after being subjected to the aforestated composition earthworms removed from the composition-containing culture media were found to have a distinct iridescent glow and wherein their livability was not deleteriously affected and the so treated worms even appeared more active and healthier than their untreated counterparts.

An amount of the composition formulated as follows has been found to be adequate for the treatment of approximately one hundred worms in accordance with this invention:

one pound pulverized paper or wood pulp
   one pound 1,2-propylene glycol
   one-quarter pound benzoic acid
   one-quarter pound methylparaben
   one-quarter pound wintergreen oil
   four pounds water.

From the foregoing, it will be readily appreciated that the present invention provides a novel method and composition for enhancing the utility of worms utilized as fish bait, for example.

Inasmuch as modifications may be resorted to without departing from the invention, it is not desired to be limited except as hereinafter defined by the appended claims.

I claim:

1. The method of enhancing the iridescence of live worms comprising the steps of adding to a cultivation bed for live worms containing suitable media for supporting worm life, the composition comprising an aqueous slurry of comminuted cellulosic material, finely divided calcium carbonate, 1,2-propylene glycol, benzoic acid, methylparaben and wintergreen; permitting the worms to carry on their life processes for a sufficient period of time for the worms to systemically utilize said composition to produce an iridescent secretion on the exterior surfaces of their bodies; and retrieving live iridescent secretion-coated worms from the cultivation bed.

2. The method of claim 1 wherein said aqueous composition comprises, on the basis of weight, as essential components, approximately one to 25 parts comminuted cellulosic material, one part comminuted clam shells, one part 1,2-propylene glycol, one-quarter to one-half part benzoic acid, one-quarter part methylparaben and one-quarter part wintergreen oil in a carrier comprising approximately four to 50 parts water.

3. The method of claim 1 wherein said composition is added to the media in the cultivation bed at the rate of approximately 8 pounds for approximately each one hundred worms contained therein.

4. A composition adapted to be added to a cultivation bed for live worms containing suitable media for supporting worm life for enhancing the iridescence of live worms being cultivated therein which comprises, on the basis of weight, as essential components, approximately 25 parts comminuted cellulosic material, one part finely divided clam shells, one part 1,2-propylene glycol, one-half part benzoic acid, one-quarter part methylparaben and one-quarter part wintergreen oil in a carrier consisting of approximately 50 parts water.

5. A composition adapted to be added to a cultivation bed for live worms containing suitable media for supporting worm life for enhancing the iridescence of live worms being cultivated therein which comprises, on the basis of weight, as essential components, approximately one part comminuted cellulosic material, one part finely divided clam shells, one part 1,2-propylene glycol, one-quarter part benzoic acid, one-quarter part methylparaben and one-quarter part wintergreen oil in a carrier consisting of approximately four parts water.